US012011844B2

(12) United States Patent
Allen, Jr. et al.

(10) Patent No.: US 12,011,844 B2
(45) Date of Patent: Jun. 18, 2024

(54) ADJUSTABLE BREAK BUNDLE BREAKER

(71) Applicant: A. G. Stacker Inc., Weyers Cave, VA (US)

(72) Inventors: Clarence C. Allen, Jr., Mt. Crawford, VA (US); Jerry Blosser, Crimora, VA (US); Eric Stempihar, Rockingham, VA (US); Randall Donn Senger, Mount Sidney, VA (US); Joseph Wunder, Lexington, VA (US)

(73) Assignee: A. G. STACKER INC., Weyers Cave, VA (US)

(*) Notice: Subject to any disclaimer, the term of this patent is extended or adjusted under 35 U.S.C. 154(b) by 268 days.

(21) Appl. No.: 17/220,973

(22) Filed: Apr. 2, 2021

(65) Prior Publication Data

US 2021/0308898 A1 Oct. 7, 2021

Related U.S. Application Data

(60) Provisional application No. 63/005,632, filed on Apr. 6, 2020.

(51) Int. Cl.
*B26F 3/00* (2006.01)
*B26D 5/00* (2006.01)
(Continued)

(52) U.S. Cl.
CPC .............. *B26F 3/002* (2013.01); *B26D 5/007* (2013.01); *B26D 5/086* (2013.01); *B26D 7/0625* (2013.01);
(Continued)

(58) Field of Classification Search
CPC .... B26D 5/007; B26D 7/0625; B26D 7/0675; B26D 7/1827; B26D 7/32; B26F 2210/02; B26F 3/02
See application file for complete search history.

(56) References Cited

U.S. PATENT DOCUMENTS 4,136,604 A * 1/1979 Schmidt ............... B26D 7/1827 225/101
4,529,114 A * 7/1985 Casper ................... B65H 35/10 225/4
(Continued)

FOREIGN PATENT DOCUMENTS

EP 3875236 A1 8/2021
WO 2008129579 A2 10/2008
(Continued)

OTHER PUBLICATIONS

Office Action from the United States Patent Office mailed Apr. 15, 2022 in related U.S. Appl. No. 17/220,968, Including examined claims 1-18.

*Primary Examiner* — Evan H MacFarlane
*Assistant Examiner* — Liang Dong
(74) *Attorney, Agent, or Firm* — J-TEK LAW PLLC; Jeffrey D. Tekanic; Scott T. Wakeman

(57) ABSTRACT

A bundle breaker has upstream and downstream breaking supports and first and second platens located above the breaking supports that are configured to be raised and lowered by actuators to selectively clamp a log between the platens and the breaking supports. A third actuator applies a shifting force to the downstream breaking support to shift an input end of the downstream breaking support relative to an output end of the upstream breaking support to break a second portion of the log from a first portion of the log. A controller controls the first actuator and the second actuator and the third actuator. Also, the controller is configured to stop or reduce the application of the shifting force in response to a determination that the second portion of the log has broken off the first portion of the log.

10 Claims, 10 Drawing Sheets

(51) Int. Cl.

| | |
|---|---|
| ***B26D 5/08*** | (2006.01) |
| ***B26D 7/06*** | (2006.01) |
| ***B26D 7/18*** | (2006.01) |
| ***B26D 7/32*** | (2006.01) |

(52) U.S. Cl.

CPC ......... *B26D 7/0675* (2013.01); *B26D 7/1827* (2013.01); *B26D 7/32* (2013.01); *B26F 2210/02* (2013.01)

(56) References Cited

U.S. PATENT DOCUMENTS

| | | | | | |
|---|---|---|---|---|---|
| 4,606,387 | A | 8/1986 | Weislogel et al. | | |
| RE35,066 | E | 10/1995 | Martin | | |
| 5,791,539 | A * | 8/1998 | Shill | B26D 7/1827 | 225/101 |
| 6,568,524 | B1 | 5/2003 | Cornell et al. | | |
| 6,655,566 | B1 * | 12/2003 | Martin | B26F 3/002 | 225/101 |
| 8,763,873 | B2 * | 7/2014 | Jans | B26F 3/002 | 225/96.5 |
| 8,777,552 | B2 | 7/2014 | Ward et al. | | |
| 8,899,407 | B2 | 12/2014 | Harrington | | |
| 9,475,660 | B2 | 10/2016 | Batrin et al. | | |
| 9,662,793 | B1 | 5/2017 | Min | | |
| 10,906,833 | B2 | 2/2021 | Huang | | |
| 2010/0108732 | A1 * | 5/2010 | Gendreau | B26F 3/002 | 225/97 |
| 2012/0027555 | A1 | 2/2012 | Germain et al. | | |
| 2015/0251944 | A1 * | 9/2015 | Brackley | B26D 7/32 | 83/76.8 |
| 2019/0152736 | A1 * | 5/2019 | Gordon | B26D 5/007 | |
| 2019/0196438 | A1 * | 6/2019 | Rivers | G05B 19/25 | |

FOREIGN PATENT DOCUMENTS

| | | | | |
|---|---|---|---|---|
| WO | 2020090179 | A1 | 5/2020 | |
| WO | WO-2020090179 | A1 * | 5/2020 | B28D 5/0011 |

* cited by examiner

ADJUSTABLE BREAK BUNDLE BREAKER

CROSS-REFERENCE TO RELATED APPLICATIONS

The present application claims the benefit of U.S. Provisional Patent Application No. 63/005,632, filed Apr. 6, 2020, the entire contents of which is hereby incorporated by reference.

TECHNOLOGICAL FIELD

The present disclosure is directed to bundle breaker configured to detect that a bundle has been broken from a log and to a method of operating such a bundle breaker.

BACKGROUND

Many products are manufactured in elongated sheets that can be separated into individual blanks along scored or perforated or partially cut lines. For example, corrugated paperboard blanks, from which boxes and other structures may subsequently be formed, are often formed in this manner.

An elongated sheet of corrugated paperboard may be divided by score lines into, e.g., five separate blanks. The score lines generally run transversely, that is, perpendicular to the length of the elongated sheet. When a plurality of the sheets are arranged in a stack, the score lines are aligned vertically. Such a stack of elongated sheets made up of individual blanks is sometimes referred to as a "log." During the processing of logs, it is necessary to break individual stacks of sheets from the log along the vertically aligned score lines (sometimes referred to as a "breaking plane" or "breaking junction"). A stack of sheets that has been broken off a log may be referred to as a "bundle." The individual portions of the log that will be broken off the log may also be referred to as "bundles" even when they are still attached to each other in the log. Therefore, a log will comprise a plurality of bundles joined together at transverse score lines which bundles can be broken off the log one at a time to form individual bundles.

Machines that receive logs and break individual bundles from the logs are known as "bundle breakers." A bundle breaker generally includes two bottom support sections, each of which may include a conveyor, and two platens, one mounted over each support section. The downstream support section can tilt or pivot relative to the upstream support section. In operation, a log is moved along the bundle breaker until a score line between a first bundle of the log and a second bundle of the log is arranged at a junction of the first conveyor and the second conveyor, and the first bundle is then clamped against the downstream support section by the first platen and the second portion of the log is clamped against the upstream support section by the second platen.

An actuator then shifts one of the support sections, usually the downstream support section, relative to the upstream support section to break the log along the score lines and separate the first bundle from the log. That first bundle is then moved away from the remaining portion of the log, and the log is shifted further downstream until the score lines separating the second bundle of the log from the third bundle of the log arrives at the breaking location at which time the process repeats until all bundles that formed the original log have been separated.

Some bundle breakers are configured to break bundles from multiple logs at the same time. That is, a plurality of logs may be arranged in parallel across the bundle breaker with the score lines separating the downstream-most bundle of each log from the rest of the respective log located at the junction of the upstream and downstream support sections. The multiple logs may be simultaneously clamped by the platens against the support sections by the first and second platens and broken simultaneously by the movement of the downstream support section relative to the upstream support section.

When multiple logs need to be broken simultaneously by the bundle breaker, it is generally desirable that all logs have the same number of elongated sheets and are thus the same height. The platens can then be moved into a predetermined position and apply the same pressure to each of the logs during the breaking process. However, it sometimes occurs that the heights of the logs are not identical. In such case, the amount of force applied against the logs by the platens must be sufficient to secure the shortest log for proper breaking. That force, however, may partially crush some of the sheets in the taller logs.

SUMMARY

These and other problems are addressed by embodiments of the present invention, a first aspect of which comprises a bundle breaker that has upstream and downstream breaking supports each having an input end and an output end, and a first platen located above the upstream breaking support and a second platen located above the downstream breaking support. First and second actuators are operably connected to the first and second platens, respectively, and configured to shift the platens toward and away from the breaking supports to selectively clamp a log between the platens and the breaking supports. A third actuator is provided to apply a shifting force to the downstream breaking support to shift an input end of the downstream breaking support relative to an output end of the upstream breaking support from a first position toward a second position to break a first portion of the log from a second portion of the log, and a controller is provided to control the first actuator and the second actuator and the third actuator. Also, the controller is configured to stop or reduce the application of the shifting force in response to a determination that the second portion of the log has broken off or is starting to break off the first portion of the log.

Another aspect of the disclosure includes a bundle breaker that has upstream and downstream breaking supports each having an input end and an output end, and a first platen located above the upstream breaking support and a second platen located above the downstream breaking support. First and second actuators are operably connected to the first and second platens, respectively, and configured to shift the platens toward and away from the breaking supports to selectively clamp a log between the platens and the breaking supports. A third actuator is provided to apply a shifting force to the downstream breaking support to shift an input end of the downstream breaking support relative to an output end of the upstream breaking support from a first position toward a second position to break a first portion of the log from a second portion of the log, and a controller is provided to control the first actuator and the second actuator and the third actuator. The bundle breaker includes a sensor configured to produce a signal indicative of a torque produced by the third actuator or a speed of the third actuator, and the controller is configured to stop the application of the shifting force in response to a predetermined change in the signal.

BRIEF DESCRIPTION OF THE DRAWINGS

These and other aspects and features of the invention will be better understood after a reading of the following detailed description in connection with the attached drawings wherein.

DETAILED DESCRIPTION

Figure 1:
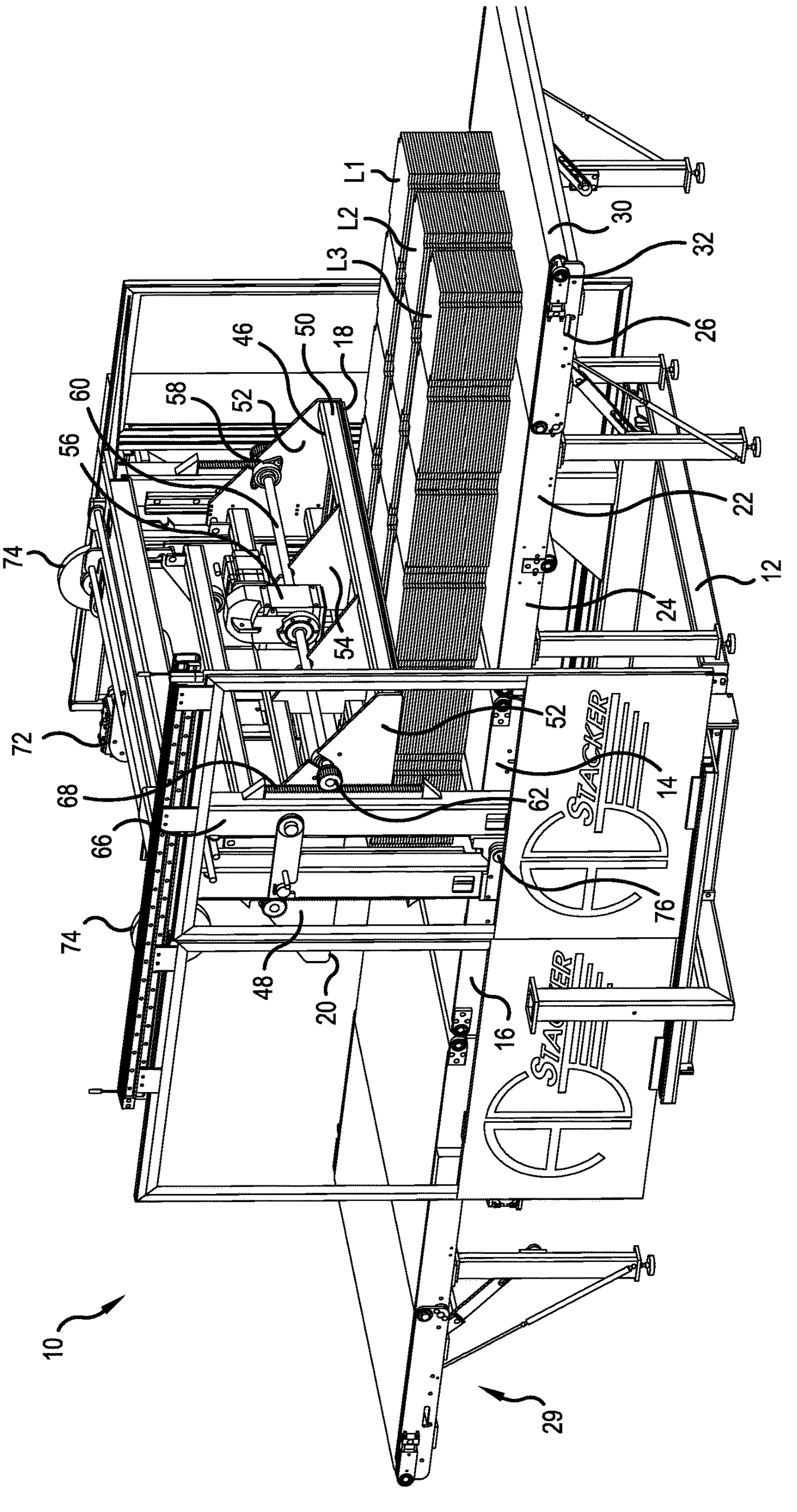
FIG. 1 is a perspective view of a bundle breaker according to an embodiment of the present disclosure.

Referring now to the drawings, wherein the showings are for purposes of illustrating presently preferred embodiments of the invention only and not for the purpose of limiting same, FIG. 1 shows a bundle breaker 10 according to the present disclosure. The bundle breaker 10 includes a frame 12 supporting an upstream breaking conveyor 14 and a downstream breaking conveyor 16. A first platen 18 is mounted to the frame 12 above the upstream breaking conveyor 16, and a second platen 20 is mounted to the frame 12 above the downstream breaking conveyor 16.

The bundle breaker 10 includes an input conveyor 22, and the input conveyor 22 has an output section 24 connected to an input end of the upstream breaking conveyor 14 and an input section 26. The input section 26 can be raised and lowered relative to the output section 24 to allow an operator to easily pass through the bundle breaker 10 to reach the other side of the bundle breaker. The input conveyor 22 includes a continuous belt 30 supported by an input end support shaft 32, an output end support shaft 34 and a center support shaft 36, the center support shaft 36 being located at a hinged connection between the input section 26 and the output section 24. A lock bar 38 holds the input section 26 in the raised position, and a gas spring 40 helps control the transition of the input section 26 from the raised to the lowered position.

The input end support shaft 32 is mounted between two plates 41 which plates 41 are each slidably mounted on a pair of rods 43 and biased away from the output section 24 by a pair of springs 45. The force produced on the input end support shaft 32 maintains a suitable tension on the belt 30 during use.

The first platen 18 is connected to the frame 12 by a first platen support 46, and the second platen 20 is connected to the frame 12 by a second platen support 48. The first platen support 46 will primarily be discussed hereafter, it being understood that the second platen support 48 is substantially identical thereto. The first platen support 46 includes a bottom frame 50 to which the first platen 18 is attached, first and second side plates 52, a motor mount 54 supported by the bottom frame 50 at a location between the first and second side plates 52 and a motor 56 supported by the motor mount 54. Each of the side plates 52 has inner sides that face the motor 56 and outer sides that face away from the motor 56. Each of the side plates 52 includes a notch 58, and a drive shaft 60 extends from either side of the motor 56 through the notches 58. A drive gear 62 is mounted at each end of the drive shaft 60 on the outer sides of the side plate 52.

Figure 6:
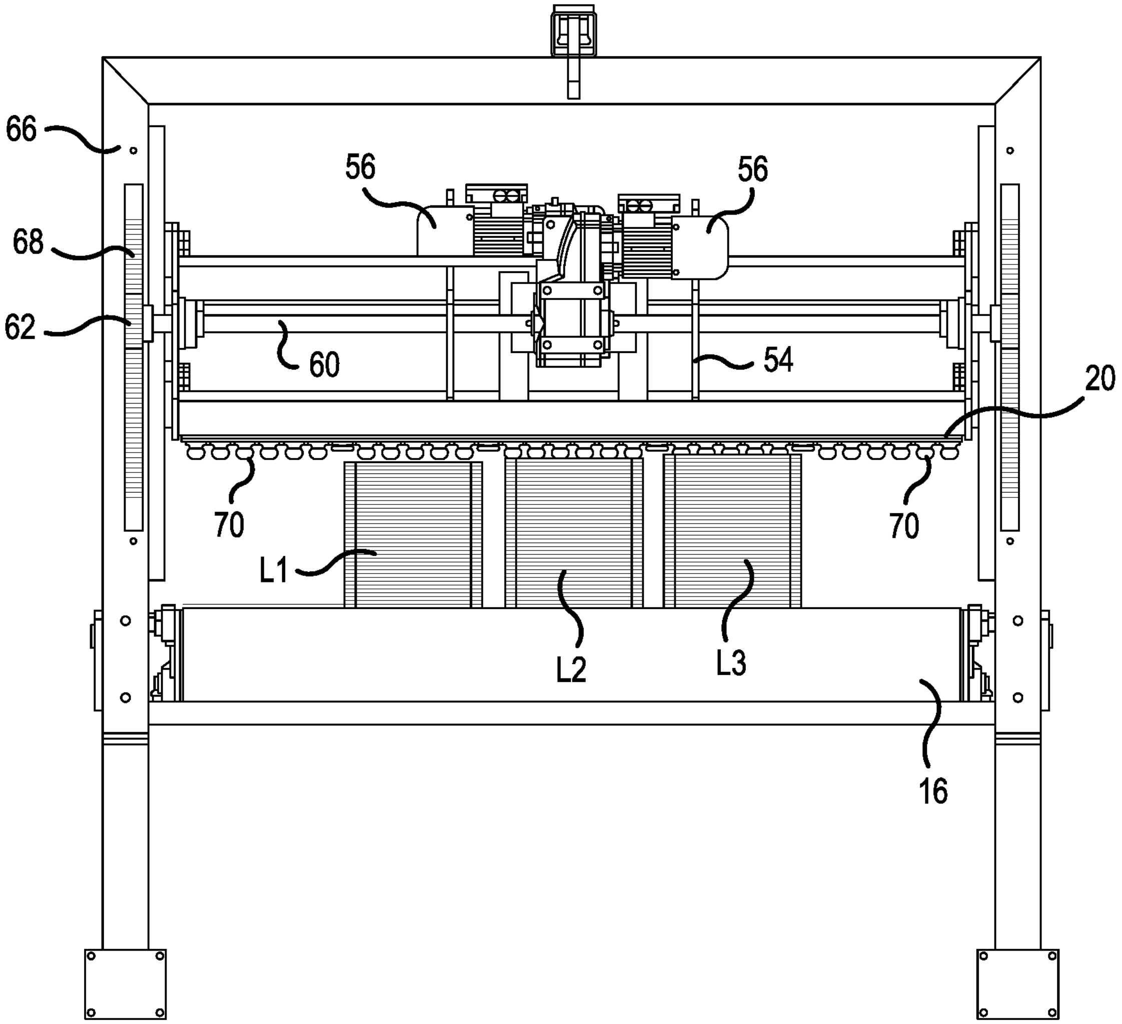
FIG. 6 is a rear elevational view of a support frame and drive for moving the second platen.
Figure 7:
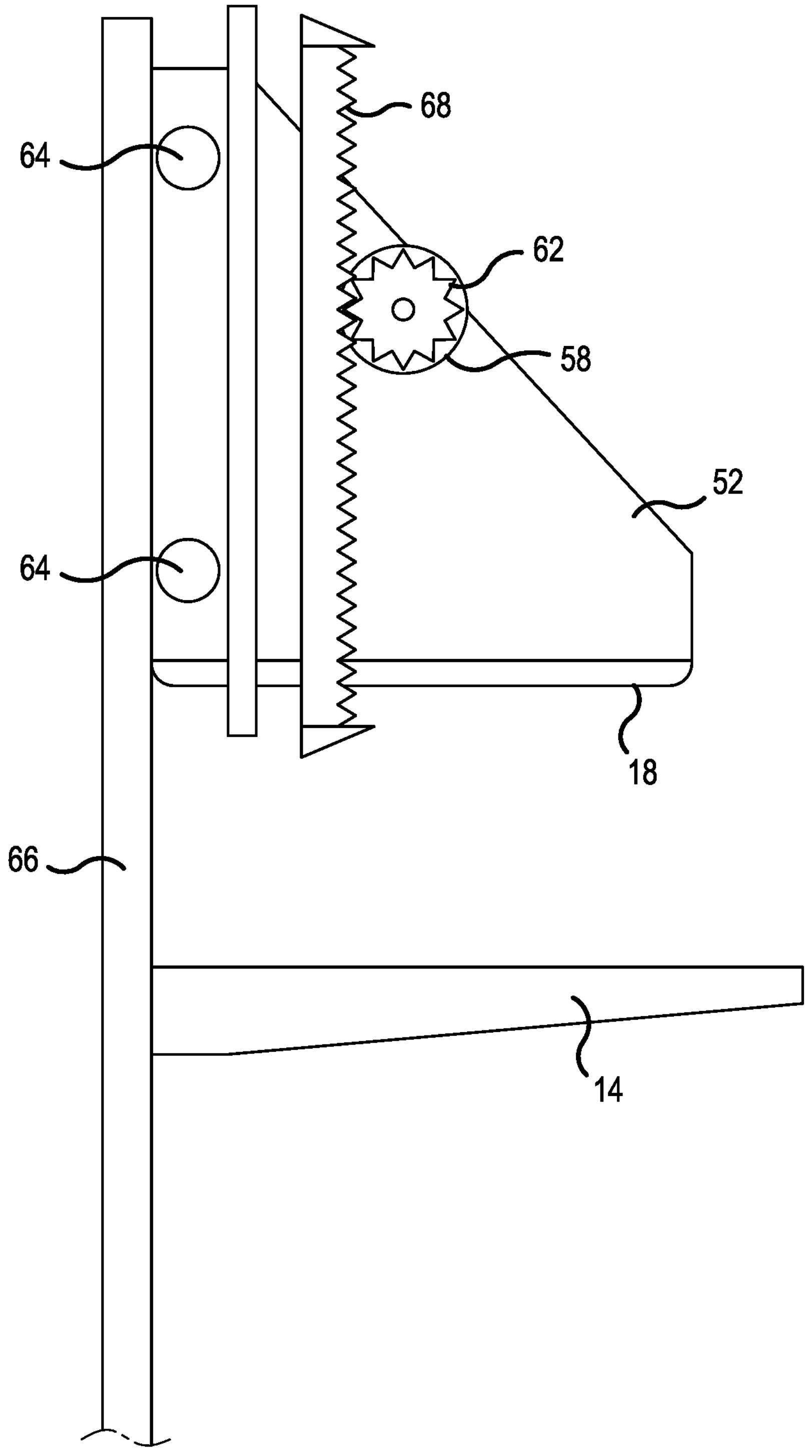
FIG. 7 is a side elevational view of part of the platen support frame of FIG. 6.

Referring now to FIG. 6, first and second vertical members 66 of the frame 12 of the bundle breaker 10 each include a rack 68 which racks 68 are engaged by the drive gears 62 when the first platen support 46 is mounted to the frame 12. The racks 68 are located on one side of the vertical member 66 while the guide wheels 64 are located on an opposite side of the vertical members 66. Driving the motor 56 in first and second direction rotates the drive shaft 60 and thus the drive gears 62 in first and second directions so as to move the first platen support frame 46 up and down along the vertical members 66 and thus move the first platen 18 away from and toward the upstream breaking conveyor 14 opposite the first platen 18.

The motor 56 preferably comprises a servo gear motor having torque feedback. A servo motor available from Siemens under the brand name/model number SIMOTICS S-1FK7 is suitable for use in the present disclosure. This motor is driven electrically and can be set to apply a predetermined limit for the torque to the drive shaft 60. In this manner, the amount of downward force exerted by the first platen 18 against a log on the upstream breaking conveyor 14 beneath the first platen 18 can be controlled, and the force can be set so as not to exceed a force that would damage the individual sheets that form the log beneath the platen 18. The motor 56 controlling the second platen 20 can be controlled in the same manner. The torque limit can be selectably set by the controller C (FIG. 12) that controls the overall operation of the bundle breaker 10 and adjusted based on the characteristics of the sheets and/or logs being processed. The controller C can comprise a microprocessor or other circuitry configured to send control signals to and receive status signals from various components of the bundle breaker 10.

In one embodiment, the servo motor 56 itself monitors torque and stops moving the first platen 18 when the measured torque exceeds a predetermined level or increases faster than a predetermined rate, either of which indicates that a maximum desired force is being applied against a log on the upstream breaking conveyor 14. In other embodiments, the servo motor 56 sends a signal indicative of the amount of torque being produced by the servo motor 56 to the controller C, and the controller C sends a signal to the servo motor 56 to stop the servo motor 56 when the controller C determines that a maximum desired force is being applied against the log.

While the use of a servo motor that is capable of sensing torque is preferred, other methods can be used to determine how forcefully the first platen 18 is pressing against a log. For example, the current drawn by the servo motor 56 can be monitored, and an increase in the current to above a certain level or an increase in a rate of change of the current that exceeds a certain rate can provide an indication of how much force is being applied against the log. In addition, signals indicative of servo motor torque can be sent to the controller C which will take appropriate actions to stop the downward movement of the first or second platen 18, 20 in response to a change in the detected torque or a rate of change of a signal.

A plurality of air bladders 70 are mounted on the side of the first platen 18 that faces the upstream breaking conveyor 14 and on the side of the second platen 20 that faces the downstream breaking conveyor 16. These air bladders 70 are exposed at the bottom sides of the first and second platens 18, 20 and are configured to make direct contact with the logs on the breaking conveyors beneath the first and second platens 18, 20. The air bladders 70 are connected to a source of compressed air or other gas (not shown), and all the air bladders 70 are configured to be inflated to a predetermined pressure. The pressures in subsets of the air bladders 70 may be independently controllable, and the subsets of air bladders can include one or more air bladders. For example, each of the air bladders 70 may be connected to a plenum (not illustrated) by individually controllable valves for selectively placing the interior of each of the air bladders 70 in fluid communication with the interior of the plenum. In addition, some or all of the air bladders 70 may include secondary or discharge valves (not illustrated) for venting the air from the air bladders 70 which discharge valves may be configured to passively open if a certain pressure is exceeded. A pressure sensor (not illustrated) can be provided in association with each air bladder 70 or in a supply line that provides air to a subset of the air bladders 70.

As used herein, descriptions of "pressurizing" one of the air bladders 70 can include leaving the air bladder open to atmospheric pressure or drawing a vacuum to reduce the interior of an air bladder to below atmospheric pressure. That is, if a first air bladder 70 is set to a first pressure and a second air bladder 70 is set to a second, lower air pressure, the first air bladder 70 and second air bladder 70 may both be pressurized to pressures higher than ambient atmospheric pressure or the second air bladder 70 may be in fluid communication with the atmosphere or at a pressure lower than atmospheric pressure. Various configurations of the air bladders 70 are possible, and the pressures in subsets of the air bladders 70 can be controlled to improve the clamping of logs against the upstream and downstream breaking conveyors 14, 16.

Figure 8:
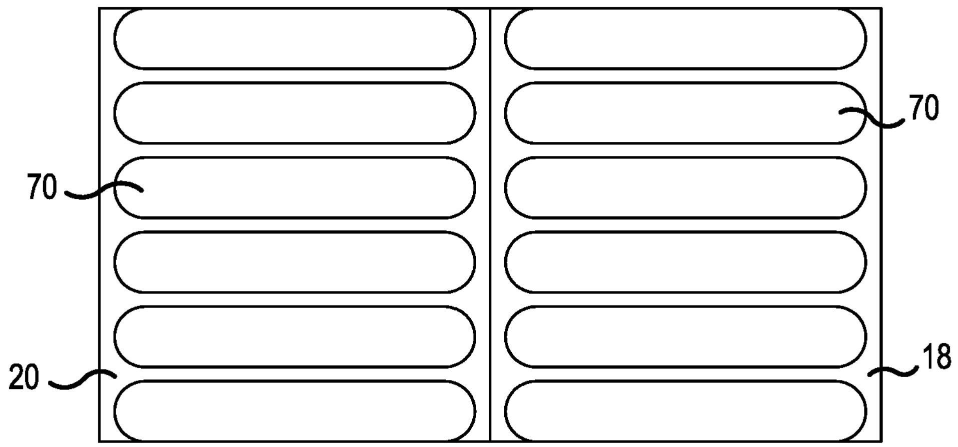
FIG. 8 is a bottom plan view of a first configuration of air bladders on the first and second platens of FIG. 1.

For example, FIG. 8 schematically shows a first configuration of the air bladders 70 on the bottoms of the first and second platens 18, 20. Unless otherwise stated, the configuration of the air bladders 70 on the second platen 20 will generally be identical to or a mirror image of the configuration of air bladders 70 on the first platen 18. Therefore, only the configuration of air bladders 70 on the first platen 18 is described below. In this embodiment, the air bladders 70 are elongated and extend from the upstream end to the downstream end of the first platen 18 parallel to the side edges of the first platen 18. Five air bladders 70 are shown on the first platen 18 in FIG. 8 but more or fewer air bladders can be provided. The pressures of at least two subsets of these air bladders, which subsets can constitute a single air bladder, are independently controllable. For example, the pressure in each individual air bladder 70 can be independently controlled.

When a log is positioned on the upstream and downstream breaking conveyors 14, 16 beneath the air bladders 70 of FIG. 8, some of the air bladders 70 are likely to overlie the longitudinal edge of the log; that is, overlie the periphery of the top surface of the log. When the first platen 18 presses the air bladders 70 against the log to secure the log to the upstream breaking conveyor 14, the air bladders 70 that overlie part of the periphery of the top surface of the log may crush or damage the edges of at least the uppermost sheet of material that forms the log. Therefore, according to an embodiment of the present disclosure, a first subset of the air bladders 70 that overlie the top surface of the log inside the periphery of the log will be inflated to a first pressure and pressed against the log by the first platen 18 with sufficient force to secure the log to the upstream breaking conveyor 14 for a subsequent breaking operation. A second subset of the air bladders 70, those that overlie the peripheral edge of the log, will be inflated to a second, lower pressure or will be unpressurized (that is, left at approximately ambient atmospheric pressure) or will be connected to a vacuum to fully collapse the second subset of the air bladders 70 and hold them away from the log. In this manner, the air bladders 70 of the first subset of air bladders 70 will securely hold the log on the upstream breaking conveyor 14 while the air bladders 70 of the second subset of air bladders 70 will not perform any (or any significant) role in securing the log to the upstream breaking conveyor 14 but will also not damage the edges of the log.

When two or more logs are present on the upstream breaking conveyor 14, different subsets of the air bladders 70 that overlie the top surfaces of each of the logs can be pressurized while air bladders 70 that overlie the longitudinally extending edges of any of the logs can be left unpressurized. Air bladders 70 that overly a transverse gap between two logs or a gap between a log and a transverse edge of the first platen 18 can also be left unpressurized to avoid potentially damaging those air bladders 70 by pressurizing them when they are not in contact with a log.

FIGS. 9*a*, 9*b*, 10*a* and 10*b* show a second configuration of air bladders 70 which configuration may be useful for breaking logs along a non-linear breaking junction. A line representing the non-linear breaking junction of the logs beneath the first and second platens 18, 20 is superimposed on the air bladders 70 in FIGS. 9*a* and 10*a*. These air bladders 70 include a first subset of air bladders 70*a* located near the junction of the first and second platens 18, 20 and a second set of air bladders 70*b* located further from the breaking junction such that the first subset of air bladders 70*a* is located between the second set of air bladders 70*b* and the breaking junction. The first and second subsets of air bladders 70*a* and 70*b* are separately controllable; for example, the first subset 70*a* of the air bladders 70 may be inflated to the same pressure as the second subset 70*b* of the air bladders for breaking certain types of logs, or the first subset of air bladders 70*a* may be inflated to a lower pressure than the second set of air bladders 70*b* or left unpressurized for reasons discussed below. The air bladders 70*a*, 70*b* in each subset of air bladders 70 may also be controlled individually.

When logs are to be broken along a non-linear breaking junction, it is generally desirable to allow the logs to flex for a distance around the breaking junction; that is, to not clamp the logs too close to the breaking junction. This can be accomplished by providing separately controllable, longitudinally shorter air bladders 70*a* near the breaking junction and leaving these shorter air bladders 70*a* uninflated (or inflating them to a lower pressure than the longer air bladders 70*b*) during a breaking operation. The longer air bladders 70*b* located further from the breaking junction are inflated to secure the one or more logs. Various ones of the longer air bladders 70*b* can also be left uninflated in order to avoid damage to the longitudinal edges of the logs as discussed above.

Figure 11:
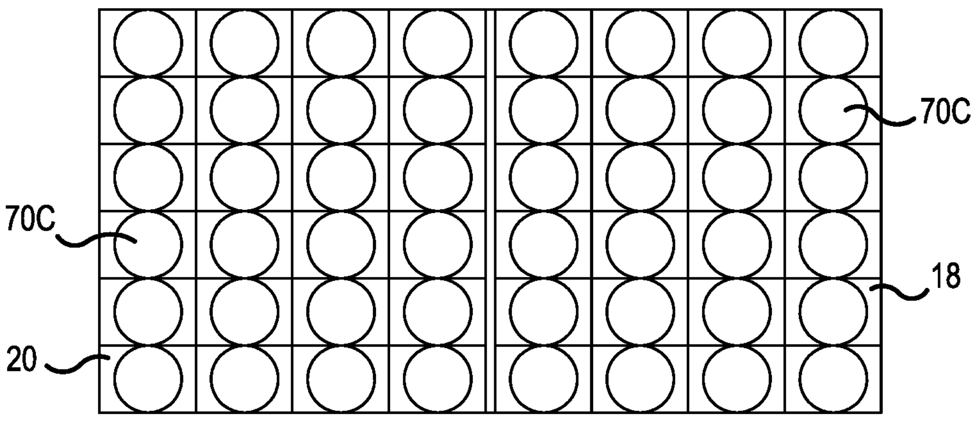
FIG. 11 is a bottom plan view of a third configuration of air bladders on the first and second platens of FIG. 1.

It is also possible to provide an array of longitudinally shorter air bladders 70, for example, as illustrated in FIG. 11, a four by six array of air bladders 70*c* on each of the upstream and downstream platens 18, 20 as illustrated in FIG. 11 or even a sixteen by sixteen (or larger) array of air bladders (not illustrated). This array can be controlled to provide the same functionality as the air bladders 70 illustrated in FIG. 8 or 9*a*, but also provides additional options for control. For example, an array of air bladders 70*c* can be controlled to avoid applying pressure to the periphery of a log at the downstream end of a bundle supported by the downstream breaking conveyor 16 or at the upstream end of the last bundle of a log on the upstream breaking conveyor 14. Certain ones of the air bladders 70*c* that overlie a center portion log could also be left uninflated based on the configuration of the log being processed, for example, to avoid a particular internal cut or opening in the sheets of material that could be damaged by being pressed on by the first platen 18.

The bundle breaker 10 further includes a breaking motor 72 operably connected to a drive disk 74 both of which are mounted on the vertical frame members 66 of the downstream breaking conveyor 14. The breaking motor 72 is preferably also a servo gear motor with torque feedback similar or identical to the motors 56 used to raise and lower the first and second platen supports 46, 48. The downstream breaking conveyor 16 is pivotably connected to the upstream breaking conveyor 14 at a hinge 76. A connecting arm 78 is connected between a peripheral edge of the drive disk 74, and the vertical support 66 of the upstream breaking conveyor 14. The breaking motor 72 is configured to rotate the drive disk 74 from a first position illustrated in FIG. 3 to a second position illustrated in FIG. 4 which causes the downstream breaking conveyor 16 to pivot about the hinge 76 such that the top surface of the downstream breaking conveyor 16 is no longer substantially coplanar with the top surface of the upstream breaking conveyor 14.

The torque produced by the breaking motor 72 can be monitored to detect a change in the torque that indicates a break has occurred. For example, less force is required to move the drive disk 74 after a clamped bundle has been broken off a log. A drop in a detected torque to below a predetermined level can therefore be used to indicate that a break has occurred. A sudden drop in the torque produced by the breaking motor 72, detected by a sudden drop in current drawn by the breaking motor 72, for example, can also indicate that a break has occurred. The break may therefore be identified by detecting the rate at which the current changes.

Figure 12:
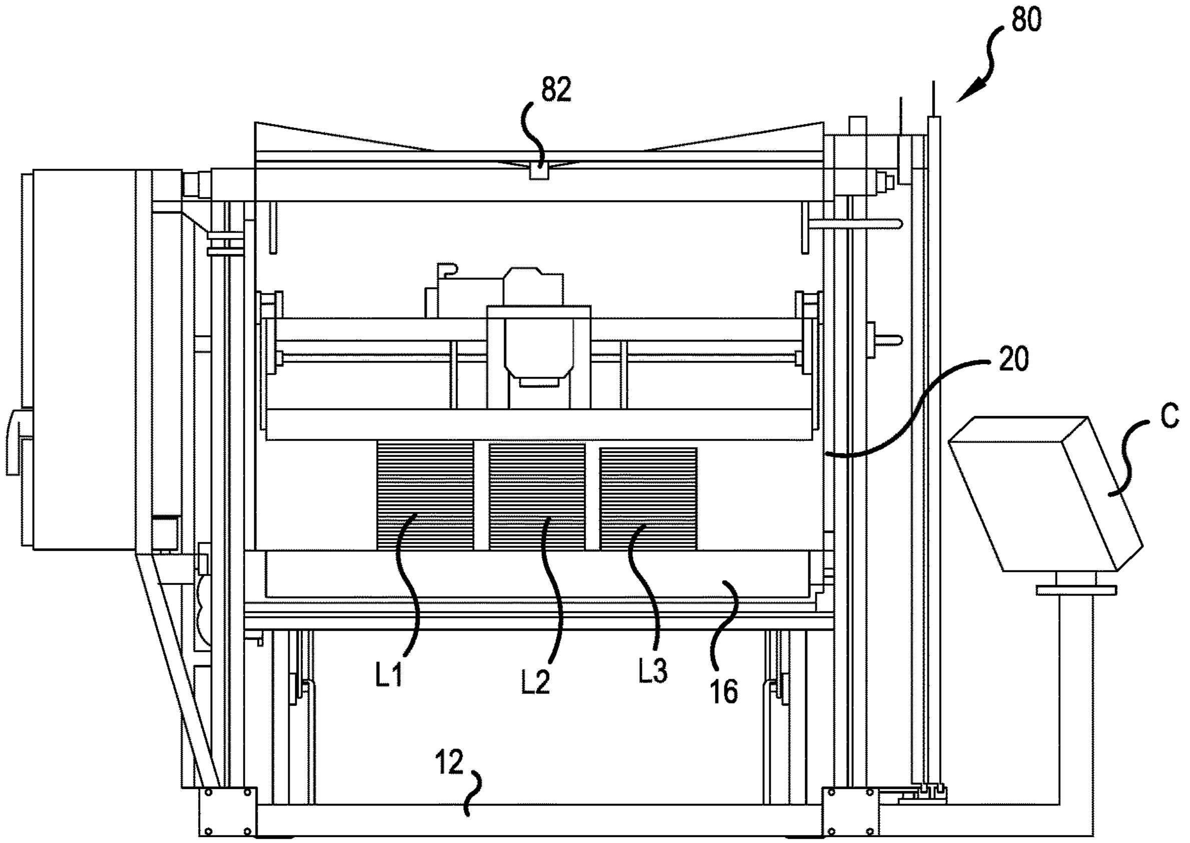
FIG. 12 is an elevational view of an output end of a bundle breaker similar to the bundle breaker of FIG. 1 that schematically shows a sensing field of a sensing system for determining the configuration and/or heights of logs on the bundle breaker.

FIG. 12 schematically shows a 2-D sensing system, such as a LIDAR (LIght Detection And Ranging) system 80, for sensing the height and configuration of the logs on the bundle breaker 10. The LIDAR system 80 also performs edge detection—that is, allows the locations of the edges of the logs and bundles to be detected. The system 80 can include at least one sensor 82. Information about the shape and height and transverse separation between the logs can be used by the controller C in order to determine which air bladders 70 should be inflated and which should remain unpressurized. That is, information regarding the relative heights of the logs on the bundle breaker 10 can be used to set a lower pressure in the air bladders 70 that will contact the tallest log and information regarding the transverse spacing between the logs will allow air bladders 70 that a) will not come into contact with a log or b) will overlie the longitudinal end of a log to be left uninflated.

Information about the surface area of the logs, which can be detected by the 2-D sensing system 80, can also be used to set a clamping pressure. Each log that arrives at the bundle breaker 10 will be scanned by the 2-D sensing system 80 to determine a height of the log and the area of the top surface of the bundle or log that will be contacted by the first platen 18 or the second platen 20. The amount of pressure applied by the first and second platens 18, 20 is directly related to the surface area of the log to be contacted by one of the platens 18, 20. That is, a greater clamping force will be applied to a bundle that has a surface area of six square feet than to a bundle having a surface area of two square feet. This is partly because the clamping force must be sufficient to compress each of the sheets in the bundle to a sufficient extent to prevent the sheets from slipping relative to each other during the breaking process while at the same time not compressing the sheets so much that they are damaged. More force is required to compress a larger surface area bundle by a given amount (by 1% of bundle height, for example) than a smaller one because a given applied force is applied over a greater surface area. A pressure-based clamping action is advantageous over a position-based clamping action because pressure-based clamping action is independent of stack height. However, to be effective, the surface area under each platen must be known. For irregular shapes, it can be difficult to determine surface area in real time. However, determining the surface area of logs, even irregularly shaped logs is possible in real-time using a fast-response 2-D sensing system. This results in a more consistent and repeatable process, which is also not easily affected by real-world imperfections, such as warped boards.

In addition, the first and second platens 18, 20 may apply a different clamping force against the bundles or portions of the log under each of the platens 18, 20. Furthermore, the force applied by each platen 18, 20 may change each time a bundle is broken from the log and the log is re-clamped. For example, if a log that has a length greater than the combined lengths of the upstream and downstream platens is moved into position in the bundle breaker with the downstream-most bundle beneath the second platen 20, the second platen 20 will make contact with the entire surface area of the downstream-most bundle. On the other hand, if the length of each bundle is less than the length of the first platen 18, the first platen 18 may contact the top surface of the bundle adjacent to the downstream-most bundle and the next adjacent bundle. That is, if five bundles in a log are numbered 1-5 with the downstream-most bundle being bundle 1, bundle 1 will be clamped between the downstream breaking conveyor 16 and the second platen 20, and bundle 2 and a portion of bundle 3 may be clamped between the upstream breaking conveyor 14 and the first platen 18. More force must be applied by the first platen 18 because that platen 18 must compress a portion of bundle 3 in addition to bundle 2.

The second platen 20 will generally clamp exactly one bundle, unless that given bundle has a length greater than that of the second platen 20. However, when the only remaining bundles are bundles 4 and 5, each of the first and second platens 18, 20 will contact the surface area of exactly one bundle and in this case, the same clamping force will be applied by each of the first and second platens 18, 20.

A representative calculation is as follows: The downward force on each of the bundles will be set to 10 times the surface area in contact with the particular platen. For example, if the surface area of the bundle is 100 square inches, a downward pressure of 1000 lbs. will be applied to produce a pressure of 10 psi on the bundles.

After a bundle is broken from a log, the 2-D sensing system will measure the height and shape of the log to make sure that the log was not damaged during the breaking process. For example, if the height of a bundle after being broken off the log is less than a predetermined percentage of the starting height of the log, the bundle should be inspected for damage. Likewise, if the top surface of the log deviates from a plane by a predetermined amount this may suggests that an edge or corner of the bundle has been damaged. Marks on the top sheet of the bundle that were not present when the bundle entered the bundle breaker may also be detected.

The operation of the bundle breaker 10 will now be described.

Figure 2:
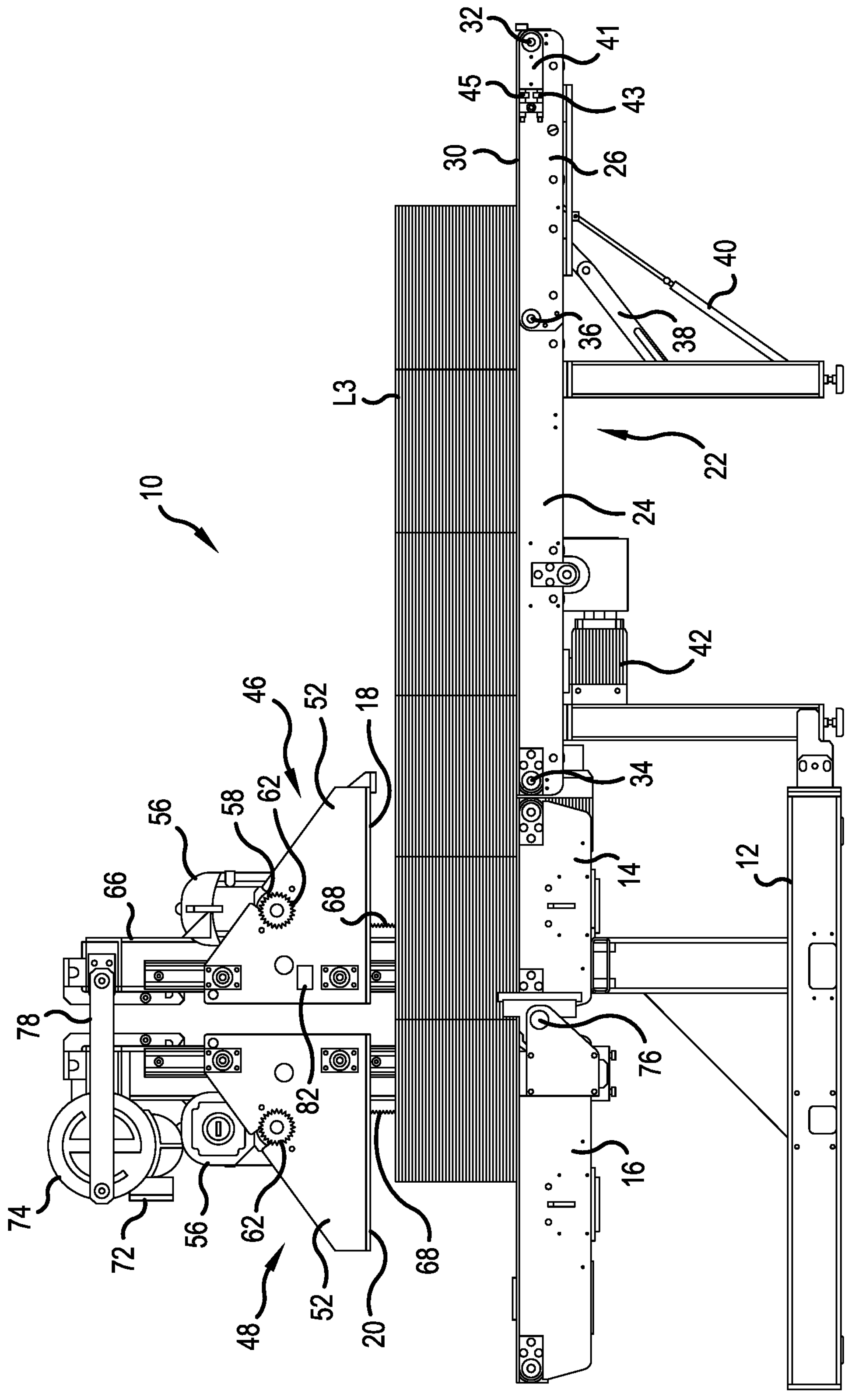
FIG. 2 is a side elevational view of the bundle breaker of FIG. 1 showing a log supported by the bundle breaker with a first bundle of the log positioned between an upstream breaking conveyor and a first platen and a second bundle of the log positioned between a downstream breaking conveyor and a second platen.

Referring to FIGS. 2 and 6, three transversely spaced logs L1, L2 and L3 are shown in the bundle breaker 10 supported on the input conveyor 22, the upstream breaking conveyor 14 and the downstream breaking conveyor 16 with the downstream-most bundle of each log resting on the downstream breaking conveyor 16 and the junction (score line, perforation, etc.) between the first and second bundles of each log located at the breaking plane or the junction between the upstream breaking conveyor 14 and the downstream breaking conveyor 16. The air bladders 70, visible in FIG. 6, that overlie the longitudinal edges of the logs will be left uninflated. Which air bladders 70 should remain uninflated can be determined visually by an operator observing the positions of the logs beneath the first and second platens 18, 20 or based on information received from the LIDAR system 80 of FIG. 12.

The first platen support 46 and the second platen support 48 are lowered by controlling the motors 56 on the first and second platen supports 46, 48 to rotate the drive shafts 60 and cause the drive gears 62 to move along the racks 68 and thus move the first and second platen supports 46, 48 toward the logs L1, L2, L3 beneath the first and second platens 18, 20. The platen supports 46, 48 are lowered until the air bladders 70 directly contact the tallest one of the logs, in this case log L3. Because the log L3 is the tallest of the logs, the air bladders 70 above the log L3 will contact the log L3 before the remaining air bladders 70 contact the logs L2 and L1. The continued downward movement of the first and second platen supports 46, 48 will compress the air bladders 70 against the first log L3.

The clamping force applied against the logs can be based on the air pressure in the interiors of the air bladders 70, which pressure can, in turn, be sensed by a pressure senor (not illustrated), and the downward movement of the first and second platen supports 46, 48 will continue until a predetermined clamping pressure is obtained. The desired pressure for the air bladders 70 on each of the first and second platens 18, 20 can be determined by the controller C based on information provided by the 2-D sensing system 80 in the manner described above. The controller C, upon receiving a pressure signal that the desired pressure is present in the air bladders 70, controls the motors 56 to stop the downward movement of the first and second platen supports 46, 48. If the interiors of the pressurized air bladders 70 are in fluid communication, the same pressure will be applied to each of the logs despite their different heights and substantially no pressure will be applied directly to the longitudinal edges of the logs which will not be in contact with any air bladder 70.

Alternately, a fixed pressure can be established in all the air bladders 70, or at least in the air bladders 70 that will contact a portion of a log without overlying a longitudinal edge of a log, before the clamping operation begins. Because the air bladders 70 that are pressed against the tallest log on the bundle breaker 10 will deform more than the air bladders 70 that are pressed against the shorter logs, damage to the logs will be minimized even if the pressures in the air bladders that contact a log are not adjusted based on log height.

Figure 10A:
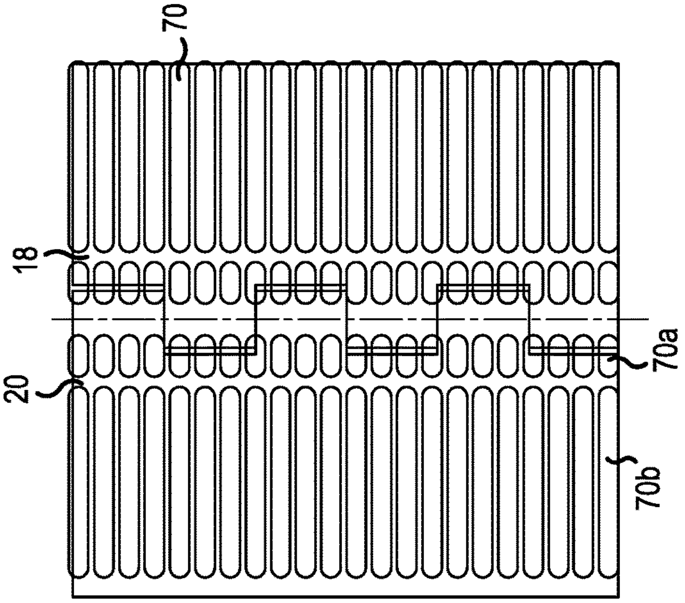
FIG. 10*a* is a bottom plan view of the first and second platens of FIG. 9*a* after a breaking operation has been performed.
Figure 10B:
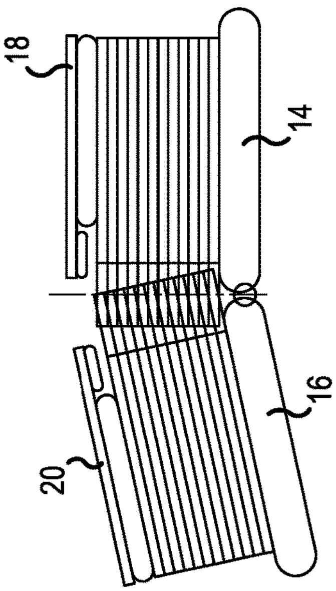
FIG. 10*b* is a side elevational view of the upstream and downstream breaking conveyor of FIG. 9*b* after the breaking operation has been performed.
Figure 9A:
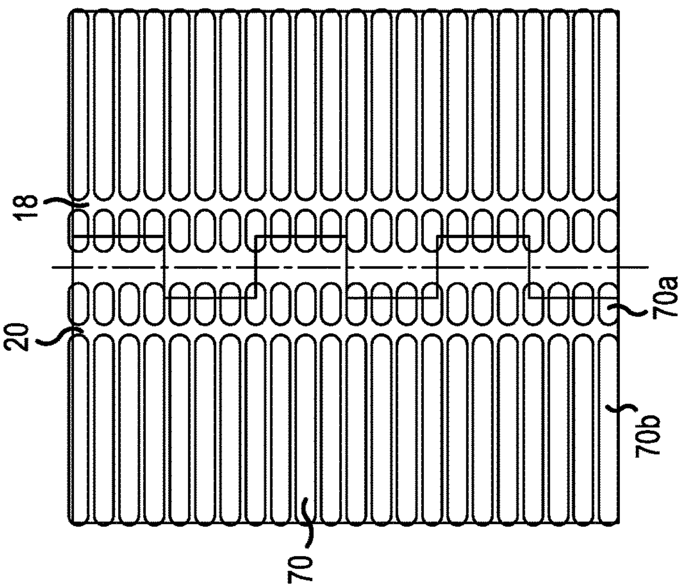
FIG. 9*a* is a bottom plan view of a second configuration of air bladders on the first and second platens of FIG. 1 prior to a breaking operation.
Figure 9B:
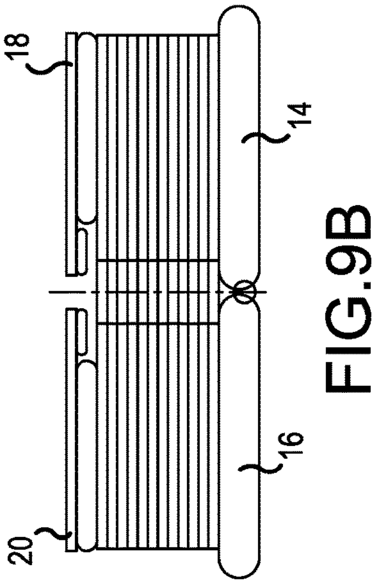
FIG. 9*b* is a side elevational view of the upstream and downstream breaking conveyors of FIG. 1 supporting a log with the first and second platens of FIG. 9*a* above the log.

When the score lines or weakened portions between adjacent bundles in the logs are substantially linear, the air bladders 70 that extend along the entire longitudinal length of the first and second platens 18, 20 can be used. When the short air bladders 70*a* and the long air bladders 70*b* are present as illustrated in FIGS. 9*a* and 10*a*, the short air bladders 70*a* and the long air bladders 70*b* can both be inflated to the same pressure so that they perform in a similar manner to the long air bladders 70 of FIG. 8.

Figure 3:
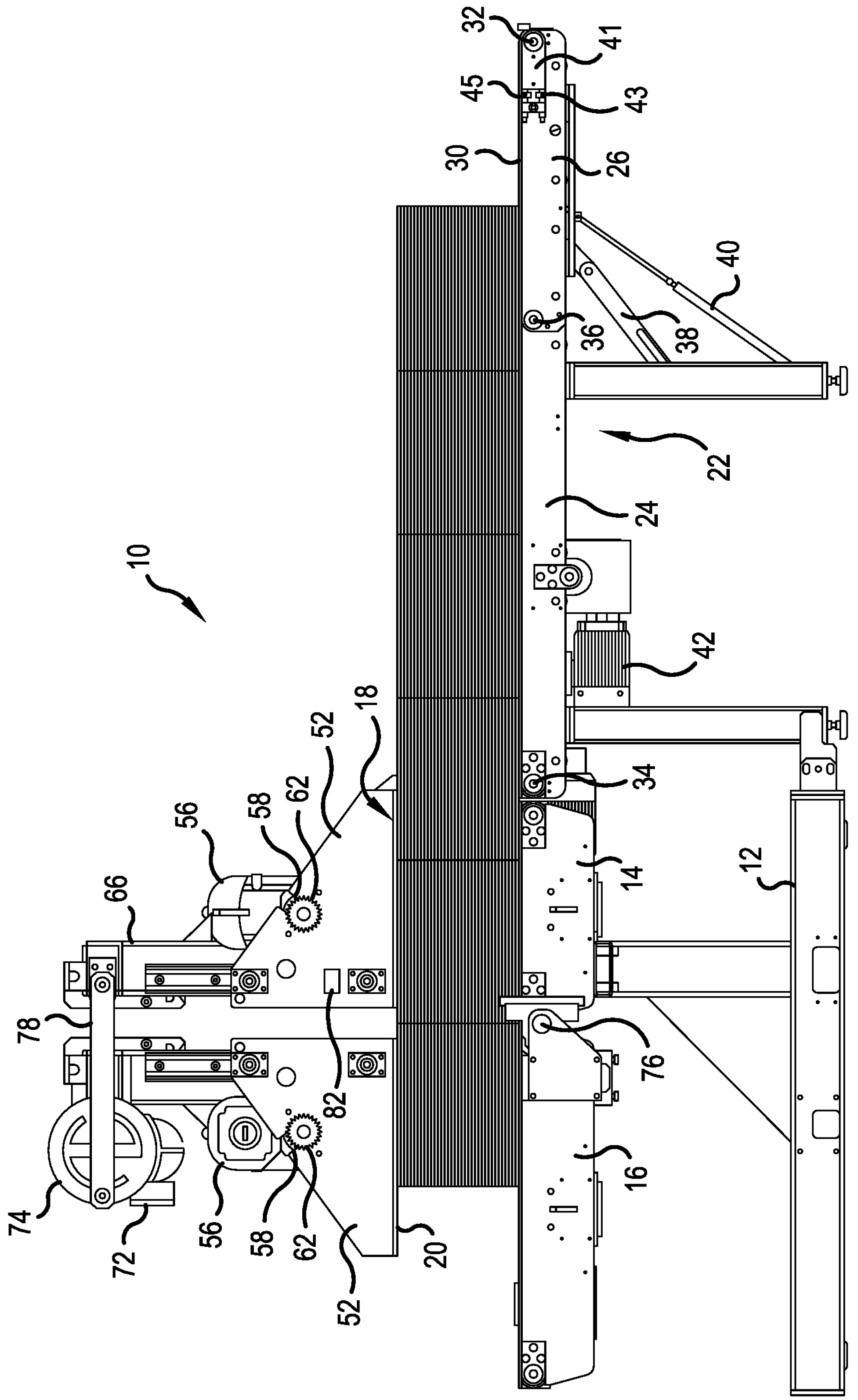
FIG. 3 is a side elevational view of the bundle breaker of FIG. 2 showing the first platen pressing the first bundle against the upstream breaking conveyor and the second platen pressing the second bundle against the downstream breaking conveyor.

FIG. 3 shows the first and second platen supports 46, 48 in the lowered position with the air bladders 70 pressed against the logs; however, the air bladders 70 themselves are not visible in FIG. 3 because they are hidden by the side plates 52 of the first and second platen supports.

Figure 4:
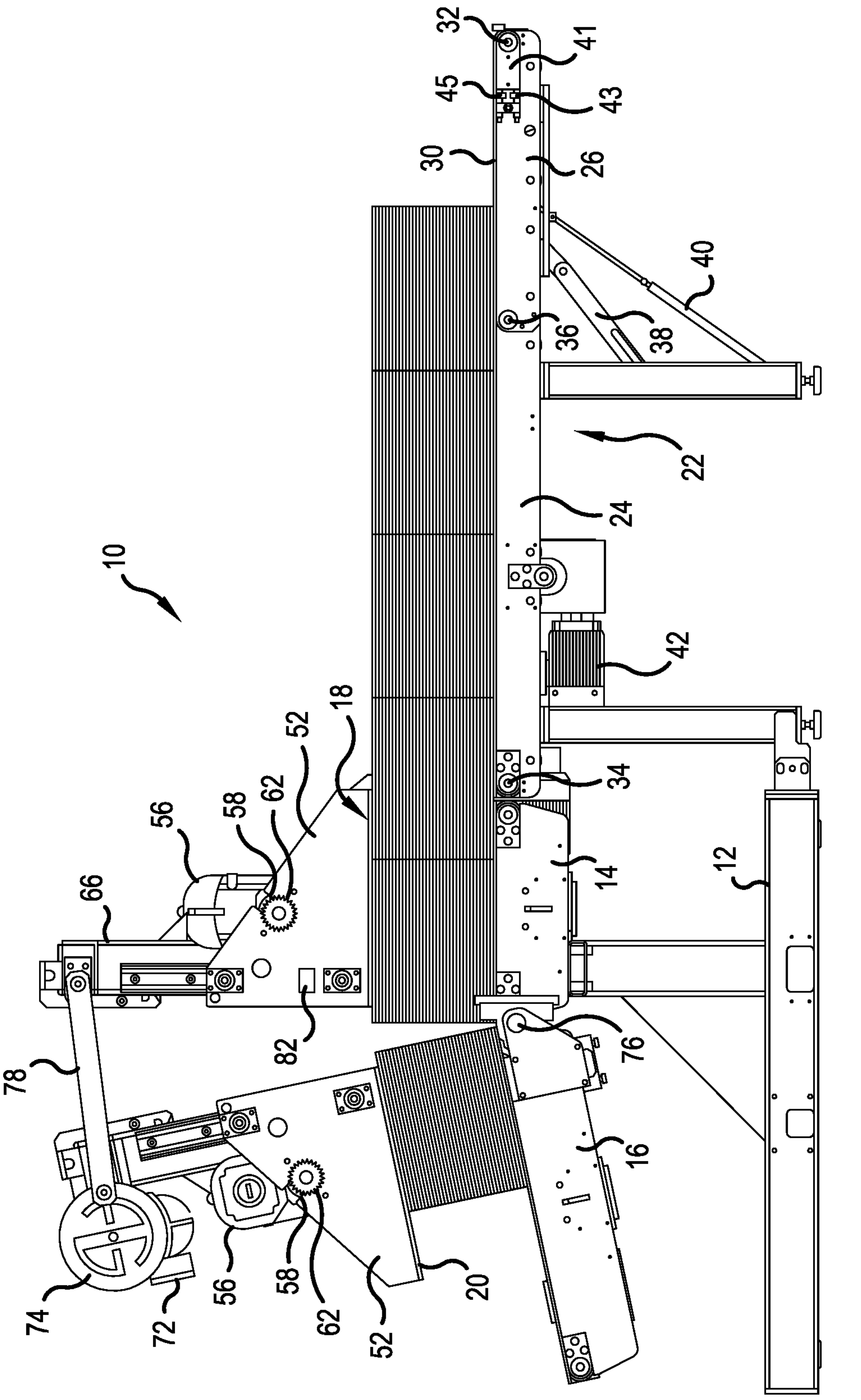
FIG. 4 is a side elevational view of the bundle breaker of FIG. 2 showing the downstream breaking conveyor shifted relative to the upstream breaking conveyor and the downstream bundle broken off the log.

With the first bundles of the three logs L1, L2 and L3 clamped between the air bladders 70 of the second platen 20 and the downstream breaking conveyor 16 and the second bundles in each log clamped between the air bladders 70 of the first platen 18 and the upstream breaking conveyor 14, the controller C causes the breaking motor 72 to rotate the drive disk 74 to shift the downstream breaking conveyor 16 about the hinge 76 from the position illustrated in FIG. 3 to the position illustrated in FIG. 4, thereby breaking the first bundles from each of the logs.

Especially when the breaking motor 70 is a servo motor, the distance moved by the downstream breaking conveyor 16 can be easily controlled. That is, in some embodiments, the breaking motor may be configured to rotate the drive disk 74 by 180 degrees during each breaking operation. However, for shorter logs, that is, logs having a smaller number of sheets, the movement of the downstream breaking conveyor 16 produced by rotating the drive disk 74 by, for example, 135 degrees, may be sufficient to perform a break. Rotating the drive disk 74 through a smaller angle allows for a more rapid return to a starting position for performing a subsequent break and may reduce cycle time.

This control can also be provided by motors that are not configured as servo motors if, for example, the speed of the motor and/or the current or voltage of the motor are monitored to determine when a break has been completed. An optical system 80 that detects the formation of a gap between the broken off bundle and the remainder of the log and/or an audio or vibration detector 82 that detects the sound or vibration produced by the break occurring or an acceleration sensor 82 that senses the sudden movement that occurs with a completed break could also provide a signal indicative of the break having occurred and be used by the controller C to control the bundle breaker 10.

Detecting when a break has occurred, by torque sensing performed by the breaking motor 72 or another method, may also allow the degree of movement to be determined during each breaking operation. That is, the breaking motor 72 will apply torque to the drive disk 74 that will increase and/or vary in a certain manner until a bundle breaks from the log at which time the resistance to movement will drop suddenly. Thus instead of rotating the drive disk 74 by a predetermined angle with every break, the movement of the drive disk 74 can be terminated (and reversed to return the downstream breaking conveyor to the position shown in FIG. 5) each time a break is detected by a sudden reduction in the amount of force required to operate the breaking motor 72. This may reduce unnecessary movement of the downstream breaking conveyor and thereby reduce cycle time.

Figure 5:
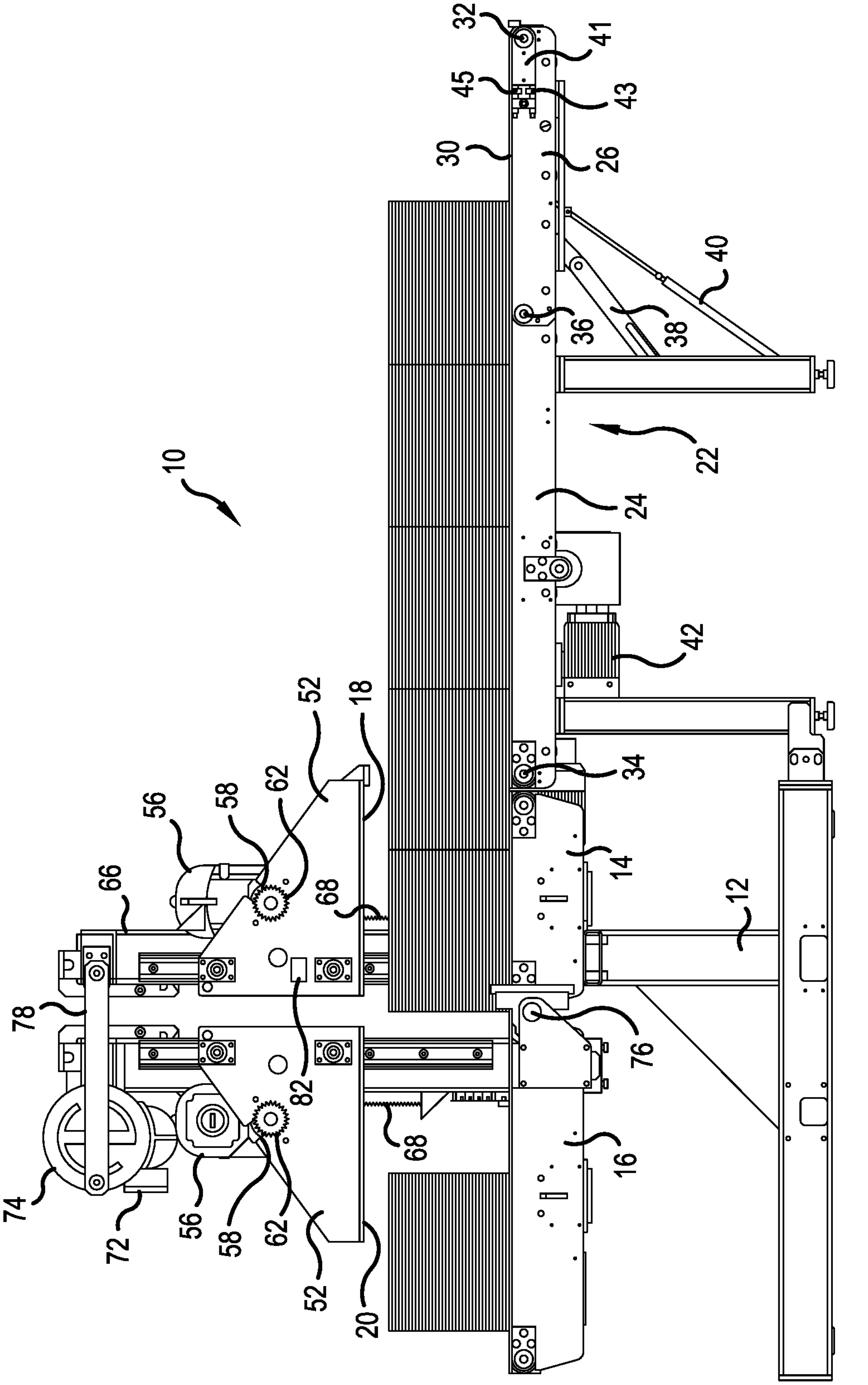
FIG. 5 is side elevational view of the bundle breaker of FIG. 2 showing the downstream breaking conveyor returned to a starting position with its top surface substantially coplanar with the top surface of the upstream breaking conveyor and the first bundle moved away from the log.

After the break is complete, the breaking motor 72 reverses direction and rotates the drive disk 74 from the position illustrated in FIG. 4 to the position shown in FIG. 5 thereby returning the top surface of the downstream breaking conveyor 16 to its starting position in substantially the same plane as the top surface of the upstream breaking conveyor 14. The controller C then drives the downstream breaking conveyor 16 to move the separated bundles away from the remaining portions of the logs for further processing. Simultaneously or shortly thereafter, the controller C cause the upstream breaking conveyor 14 and optionally the input conveyor 22 to move the logs further downstream until the next bundle to be broken from the logs is located on the downstream breaking conveyor 16 at which point the above cycle repeats.

The present invention has been described above in terms of presently preferred embodiments. Modifications and additions to these embodiments will become apparent to persons of ordinary skill in the art upon a reading of the foregoing description. It is intended that all such modifications and additions form a part of the present invention to the extent they fall within the scope of the several claims appended hereto.

We claim:

1. A bundle breaker comprising:

an upstream breaking support having an input end and an output end, a first platen located above the upstream breaking support, a first actuator operably connected to the first platen and configured to shift the first platen toward a raised position above the upstream breaking support and toward a lowered position above the upstream breaking support to selectively clamp a first portion of a log between the first platen and the upstream breaking support, a downstream breaking support having an input end and an output end, a second platen located above the downstream breaking support, a second actuator operably connected to the second platen and configured to shift the second platen toward a raised position above the downstream breaking support and toward a lowered position above the downstream breaking support to selectively clamp a second portion of the log between the second platen and the downstream breaking support, a third actuator configured to apply a shifting force to the downstream breaking support to shift the downstream breaking support and the second platen relative to the upstream breaking support from a first position toward a second position until the second portion of the log is broken from the first portion of the log, a sensor configured to detect that the second portion of the log has broken off the first portion of the log and to send a signal to the controller to indicate that the second portion of the log has broken off the first portion of the log, and a controller configured to control the first actuator, the second actuator and the third actuator, wherein the controller is configured to stop or reduce the application of the shifting force in response to a determination that the second portion of the log has broken off the first portion of the log, and wherein the sensor comprise a sensor of a 2-D sensing system.

2. The bundle breaker according to claim 1, wherein the downstream breaking support comprises a downstream breaking conveyor.

3. The bundle breaker according to claim 2, wherein the upstream breaking support comprises an upstream breaking conveyor.

4. The bundle breaker according to claim 1, wherein the third actuator comprises a servo motor.

5. A method comprising:

providing the bundle breaker according to claim 1, positioning the log on the bundle breaker such that the second portion of the log is supported by the downstream breaking support and the first portion of the log is supported by the upstream breaking support, controlling the first actuator to shift the first platen toward the lowered position of the first platen, controlling the second actuator to shift the second platen toward the lowered position of the second platen, controlling the third actuator to apply the shifting force to the downstream breaking support, and stopping or reducing the application of the shifting force in response to the determination that the second portion of the log has broken off the first portion of the log.

6. The bundle breaker according to claim 1, wherein the first platen includes at least one air bladder configured to be compressed by the first platen clamping the first portion of the log between first platen and the upstream breaking support.

7. The bundle breaker according to claim 1, wherein the sensor comprises a sensor of a LIDAR sensing system.

8. The bundle breaker according to claim 1, wherein the second platen and the downstream breaking support are pivotable together about a common pivot axis.

9. The bundle breaker according to claim 8, wherein the common pivot axis is located at a junction of the upstream breaking support and the downstream breaking support.

10. A bundle breaker comprising:

an upstream breaking support having an input end and an output end, a first platen located above the upstream breaking support, a first actuator operably connected to the first platen and configured to shift the first platen toward a raised position above the upstream breaking support and toward a lowered position above the upstream breaking support to selectively clamp a first portion of a log between the first platen and the upstream breaking support, a downstream breaking support having an input end and an output end, a second platen located above the downstream breaking support, a second actuator operably connected to the second platen and configured to shift the second platen toward a raised position above the downstream breaking support and toward a lowered position above the downstream breaking support to selectively clamp a second portion of the log between the second platen and the downstream breaking support, a third actuator configured to apply a shifting force to the downstream breaking support to shift the downstream breaking support and the second platen relative to the upstream breaking support from a first position toward a second position until the second portion of the log is broken from the first portion of the log, a controller configured to control the first actuator, the second actuator and the third actuator, and a LIDAR sensing system configured to sense a configuration of the second portion of the log, wherein the controller is configured to stop or reduce the application of the shifting force in response to a determination that the second portion of the log has broken off the first portion of the log, and wherein the determination that the second portion of the log has broken off the first portion of the log is based on a signal output by the LIDAR sensing system.

* * * * *